(12) United States Patent
Silva

(10) Patent No.: US 12,654,417 B2
(45) Date of Patent: Jun. 16, 2026

(54) ADDITIVE MANUFACTURING OF MULTILAYERED STRUCTURES

(71) Applicant: FMC Technologies, Inc., Houston, TX (US)

(72) Inventor: Gabriel Silva, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 126 days.

(21) Appl. No.: 18/639,184

(22) Filed: Apr. 18, 2024

(65) Prior Publication Data

US 2025/0326197 A1      Oct. 23, 2025

(51) Int. Cl.
| | |
|---|---|
| *B32B 1/08* | (2006.01) |
| *B32B 7/05* | (2019.01) |
| *B32B 15/04* | (2006.01) |
| *B32B 15/18* | (2006.01) |
| *B32B 37/00* | (2006.01) |
| *B32B 37/12* | (2006.01) |
| *B32B 37/24* | (2006.01) |
| *B32B 38/00* | (2006.01) |
| *B32B 38/04* | (2006.01) |

(Continued)

(52) U.S. Cl.
CPC .................. *B32B 1/08* (2013.01); *B32B 7/05* (2019.01); *B32B 15/043* (2013.01); *B32B 15/18* (2013.01); *B32B 37/0053* (2013.01); *B32B 37/1284* (2013.01); *B32B 37/24* (2013.01); *B32B 38/04* (2013.01); *B32B 38/1858* (2013.01); *B32B 38/1875* (2013.01); *B32B 41/00* (2013.01); *B32B 2037/243* (2013.01); *B32B 2255/06* (2013.01); *B32B 2311/30* (2013.01)

(58) Field of Classification Search
CPC ..... B29C 53/562; B32B 15/043; B32B 41/00; F17C 2209/2154; B21C 37/06; B21C 37/08; Y10T 156/1033; F16L 9/16; F16L 9/165; B33Y 10/00; B33Y 30/00
See application file for complete search history.

(56) References Cited

U.S. PATENT DOCUMENTS

| | | | |
|---|---|---|---|
| 1,712,090 | A | 5/1929 | Murphy |
| 3,163,183 | A | 12/1964 | Sagara |
| 3,191,289 | A | 6/1965 | Fleischer |

(Continued)

FOREIGN PATENT DOCUMENTS

| | | | |
|---|---|---|---|
| DE | 102008024009 A1 | 12/2009 | |
| EP | 1857194 A1 | 11/2007 | |

(Continued)

OTHER PUBLICATIONS

PCT Patent Application PCT/US2025/22422 International Search Report and Written Opinion of the International Searching Authority issued Jul. 7, 2025.

(Continued)

*Primary Examiner* — Carson Gross
(74) *Attorney, Agent, or Firm* — Erise IP, P.A.

(57)      ABSTRACT

Systems, methods, and devices relating to an additively manufactured multilayered structure. The additively manufactured multilayered structure may be provided by unspooling a material roll of laminate material using a roller system. A welding device may be used to apply welds between layers of the laminate material to distribute a loading between the layers during use.

20 Claims, 6 Drawing Sheets

(51) Int. Cl.
    *B32B 38/18*      (2006.01)
    *B32B 41/00*      (2006.01)

(56)           References Cited

U.S. PATENT DOCUMENTS

| | | | | |
|---|---|---|---|---|
| 7,066,232 B2 * | 6/2006 | Jung | ....................... | C23G 3/028 |
| | | | | 156/543 |
| 2020/0282440 A1 * | 9/2020 | McNeil | ................. | B21C 37/154 |

FOREIGN PATENT DOCUMENTS

| | | | | |
|---|---|---|---|---|
| EP | 2986402 A1 | 2/2016 | | |
| WO | WO-2015121950 A1 * | 8/2015 | ............. | B21C 37/08 |

OTHER PUBLICATIONS

Anna Rudawska, Adhesive Properties of Metals and Metal Alloys, from the Edited Volume: Surface Energy, Dec. 16, 2015.

* cited by examiner

700

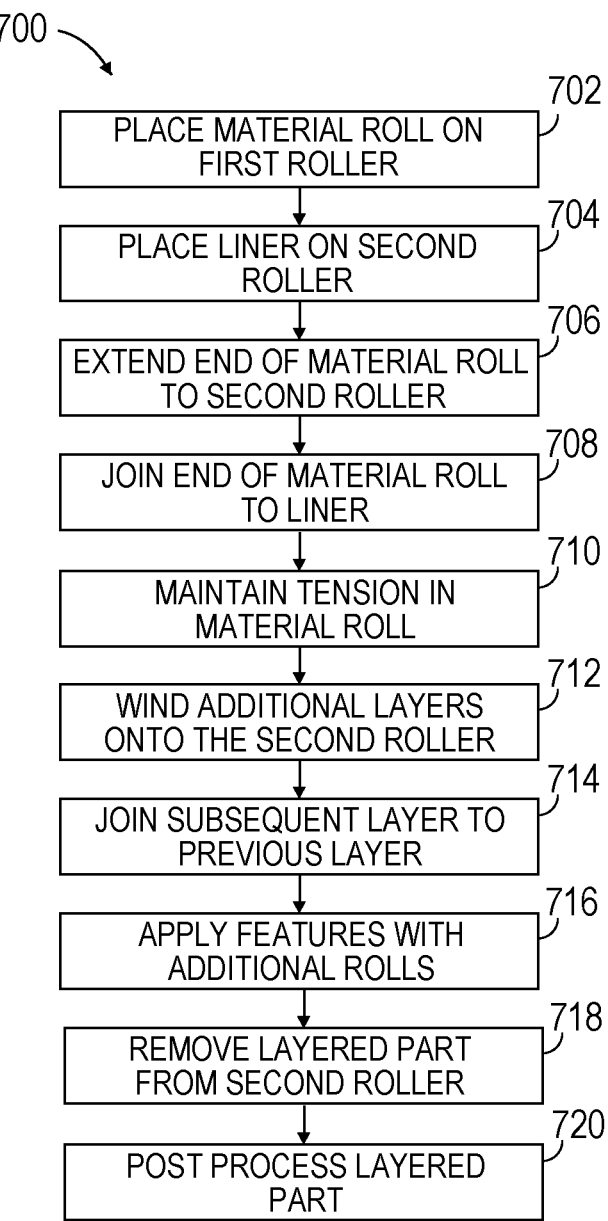

702
PLACE MATERIAL ROLL ON
FIRST ROLLER

704
PLACE LINER ON SECOND
ROLLER

706
EXTEND END OF MATERIAL ROLL
TO SECOND ROLLER

708
JOIN END OF MATERIAL ROLL
TO LINER

710
MAINTAIN TENSION IN
MATERIAL ROLL

712
WIND ADDITIONAL LAYERS
ONTO THE SECOND ROLLER

714
JOIN SUBSEQUENT LAYER TO
PREVIOUS LAYER

716
APPLY FEATURES WITH
ADDITIONAL ROLLS

718
REMOVE LAYERED PART
FROM SECOND ROLLER

720
POST PROCESS LAYERED
PART

FIG. 7

ADDITIVE MANUFACTURING OF MULTILAYERED STRUCTURES

BACKGROUND

1. Field

Embodiments of the present disclosure relate to additive manufacturing. More specifically, embodiments of the present disclosure relate to additively manufacturing multilayered structures.

2. Related Art

Traditional manufacturing techniques such as casting, forging, molding, and extrusion are associated with long lead times and are not suited for providing complex parts on demand. Further, said traditional manufacturing techniques require additional time for the transportation of fabricated parts. For example, subsea applications such as pressure retaining pipes, connectors, and housings require specific dimensions and pressure ratings based on the specific context of the subsea application. Accordingly, the above-mentioned manufacturing techniques are not suited to provide complex parts with specific dimensions and pressure ratings on-demand over a short period of time because of the long lead times.

Additionally, the space requirements for techniques such as casting and forging are restrictive because of the relatively large equipment used and lack of scalability. Further still, newer techniques such as 3-D printing may be capable of providing specific parts for a particular context but face similar issues such as long lead times and large space requirements. In addition, techniques such as 3-D printing rely on extensive post-processing after the initial manufacturing stage.

SUMMARY

Embodiments of the present disclosure may solve the above-mentioned problems by providing systems and methods for additive manufacturing of a multilayered structure. A plurality of connected layers of thin laminate material may be spooled to form a multilayered structure that meets particular pressure ratings and can be produced on demand for subsea applications.

In some aspects, the techniques described herein relate to a system for additively manufacturing a multilayered structure, the system including: a material roll of laminate material; a roller configured to unspool the laminate material from the material roll and wind a plurality of layers of the laminate material onto a liner; a tensioner device configured to maintain tension in the material roll during winding of the plurality of layers onto the liner; and an automated welder configured to weld a first layer of the plurality of layers to the liner and to weld at least one subsequent layer of the plurality of layers to a previous layer.

In some aspects, the techniques described herein relate to a process for additively manufacturing a multilayered structure, the process including: providing a material roll of laminate material; unspooling the material roll of laminate material onto a roller to form a plurality of layers; simultaneously maintaining tension in the material roll while unspooling the material roll; and welding, using an automated welding device, at least one subsequent layer of the plurality of layers to a previous layer of the plurality of layers to form the multilayered structure.

In some aspects, the techniques described herein relate to a system for additively manufacturing subsea structures on-demand and onsite, the system including: a material roll of laminate steel material; a roller configured to unspool the laminate steel material under tension from the material roll and wind a plurality of layers of the laminate steel material onto the roller; and a welding device configured to weld at least one subsequent layer of the plurality of layers to a previous layer.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present disclosure will be apparent from the following detailed description of the embodiments and the accompanying drawing figures.

BRIEF DESCRIPTION OF THE DRAWING FIGURES

Embodiments of the present disclosure are described in detail below with reference to the attached drawing figures, where:

FIG. 7 illustrates an exemplary method of additively manufacturing a multi-layered structure.

Figure 1A:
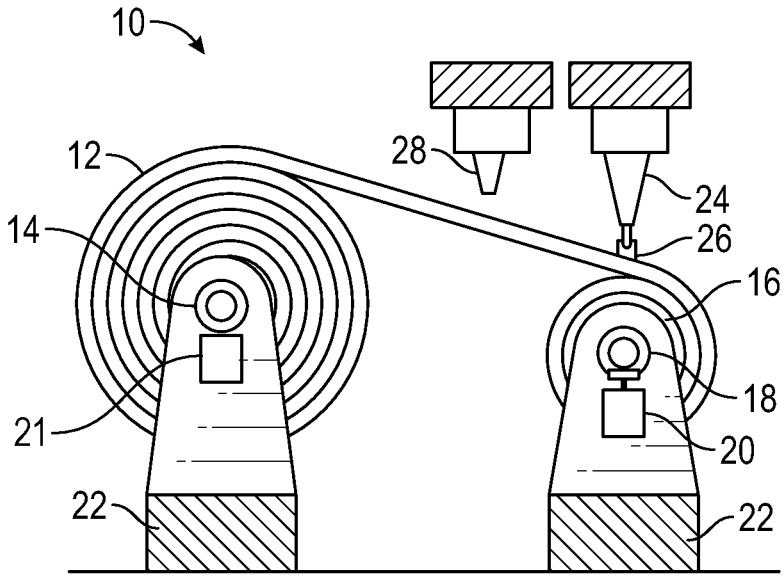
FIGS. 1A and 1B illustrate an exemplary additive manufacturing system.

The drawing figures do not limit the present disclosure to the specific embodiments disclosed and described herein. The drawings are not necessarily to scale, emphasis instead being placed upon clearly illustrating the principles of the present disclosure.

DETAILED DESCRIPTION

The following detailed description references the accompanying drawings that illustrate specific embodiments in which the present disclosure can be practiced. The embodiments are intended to describe aspects of the present disclosure in sufficient detail to enable those skilled in the art to practice the present disclosure. Other embodiments can be utilized, and changes can be made without departing from the scope of the present disclosure. Therefore, the following detailed description is not to be taken in a limiting sense. The scope of the present disclosure is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments but is not necessarily included. Thus, the technology can include a variety of combinations and/or integrations of the embodiments described herein.

Embodiments of the present disclosure relate to systems and methods for providing additively manufactured multilayered structures, as well as to said multilayered structures themselves. In some embodiments, an additive manufacturing rolling process is used to spool layers of a laminate material onto a roll or a liner to provide a multilayered part. Any combination of adhesives, surface finishing techniques, and welding may be used to bind the layers, as will be described in further detail below.

FIG. 1A illustrates a side view of an exemplary additive manufacturing system 10 relating to some embodiments. The additive manufacturing system 10 may be used to provide a process of additive manufacturing of a multilayered structure. The system 10 includes a material roll 12, as shown, positioned on a first roller 14. The material roll 12 may include a thin, flexible laminate material such that the material may be spooled and unspooled from the material roll 12. For example, in some embodiments, the material roll 12 includes a thin laminate steel material. The material roll 12 may extend to a liner 16 positioned on a second roller 18 such that an end of the material roll 12 may be welded or otherwise attached to the liner 16. Alternatively, embodiments are contemplated in which the liner 16 is not included. In some such embodiments, for example, the end of the material roll 12 may be attached directly to the second roller 18, at least temporarily during a layering process.

In some embodiments, the liner 16 includes a rigid structure formed of a metal alloy, such as an Inconel™ or another suitable metal alloy. Additionally, embodiments are contemplated in which the liner 16 includes other materials such as ceramics, composites, elemental metals, or polymers. Further, in some embodiments, at least an inner surface of the liner 16 may be corrosion-resistant. For example, the liner 16 may include a corrosion-resistant coating disposed over an internal surface that prevents corrosion of other portions of the liner 16 or of other components disposed around the liner 16. Alternatively, in some embodiments, the entire structure of the liner 16 includes a corrosion-resistant material.

The rollers 14 and 18, as described herein, may include any combination of a substantially cylindrical structure, one or more bearings, supports, motors, and brakes. In some embodiments, additional elements not explicitly shown may be included in the roller system. For example, an idler roller may be disposed between the first roller 14 and the second roller 18. The idler roller may be configured to maintain tension in the material roll 12 and/or to stabilize the material roll 12 during operation. Further, in some embodiments, any of the rollers described herein may be servo-rollers including one or more servomotors configured to actively control torque and rotation of the rollers.

In some embodiments, the thin laminate material described herein may refer to a laminate material with a thickness of less than one-fourth of an inch. For example, a thin laminate steel material is contemplated with a thickness of one-eighth of an inch such that the typically rigid steel material is able to bend to spool and unspool from the material roll 12. In some embodiments, a thickness of the laminate steel material is about one-sixteenth of an inch. However, it should be understood that, in some embodiments, other thicknesses are contemplated, such as less than one inch, less than one-half of an inch, and less than one-eighth of an inch.

In some embodiments, at least one motor 20 is included to drive rotation of the first roller 14 and the second roller 18. For example, motor 20 may be disposed on the second roller 18, as shown, to drive rotation of the second roller 18 such that the material roll 12 is pulled toward the second roller 18, thereby causing rotation of the first roller 14. Alternatively, or additionally, in some embodiments, both rollers 14 and 18 may be actively driven. For example, a first motor may be disposed on the first roller 14 and a second motor may be disposed on the second roller 18. Further, embodiments are contemplated in which one roller is actively driven while the other roller is passively controlled. For example, a friction bearing may be included on the first roller 14 to maintain tension in the material roll 12.

In some embodiments, motor 20 is disposed on the second roller 18, and braking mechanism 21 is disposed on first roller 14. In such embodiments, the braking mechanism 21 is configured to maintain tension in the material roll 12 and, in some instances, prevent rotation of the material roll 12 and first roller 14. Further still, embodiments are contemplated in which other devices are used to actively and passively control the rotation of the rollers 14 and 18. For example, in some embodiments, any combination of motors, brakes, clutches, freewheel, one-way clutch, and friction bearings may be used to control the rotation of the rollers 14 and 18 and/or maintain tension in material roll 12.

In some embodiments, the additive manufacturing system 10 includes one or more support structures 22. For example, the support structures 22 may be configured to support either or both of the first roller 14 and the second roller 18. Further, in some embodiments, additional support structures 22 may be included to support other elements of the system 10. The support structures 22 may include any combination of legs, fixed structures, or other structures for supporting the first roller 14, the second roller 18, and other elements of the system 10. Alternatively, or additionally, embodiments are contemplated in which the first roller 14 and the second roller 18 are supported by a larger housing structure such that support structures 22 may be used to anchor the rollers 14 and 18 to the housing structure, ground, or another stable support.

The system 10 may further include at least one welder 24, as shown. In some embodiments, the welder 24 is disposed proximate to the second roller 18 such that the welder 24 can apply any number of welds 26 to the material roll 12. For example, the welder 24 may be configured to apply a weld 26 between the material roll 12 and the liner 16, as shown. Additionally, the welder 24 may be configured to apply welds 26 to subsequent layers of the material roll 12 as the material roll 12 is wound onto the second roller 18. In some embodiments, the welds 26 may include spot welds, continuous welds, or combinations thereof.

The welder 24, as described herein, may be configured to perform any one or combination of laser beam welding (LBW), fusion welding, metal inert gas (MIG) welding, plasma arc welding, tungsten inert gas (TIG) welding, electron beam welding (EBW) stick welding, flux welding, or spot welding. However, it should be understood that other suitable forms of welding not explicitly described herein may be performed by the welder 24. Further, in some embodiments, the welder 24 may be an autonomous welder configured to apply a weld autonomously with little to no manual operator intervention. For example, a laser beam welding device may be fixed to one or more robotically controlled structural members such that the laser beam welding device may be moved into position using the structural members. Further, in some embodiments, the welder 24 may be fixed along at least one axis. For example, embodiments are contemplated in which the welder 24 includes a laser beam welder configured to translate across a rail that is perpendicular to the direction of winding. Alternatively, in some embodiments, manual forms of welding may be used, such as by an operator with a manual welding device.

In some embodiments, welding techniques may be used to join the material roll 12 to the liner 16 and the layers of the material roll 12 without a filler metal or filler material. Instead, such embodiments contemplate fusion welding by melting the material directly without using a filler metal. For example, a laser welder may be included to focus a laser beam onto one or more surfaces of the material roll 12 to melt the material roll 12 and/or the liner 16 such that the liner 16 and the end of the material roll 12 are fused together. A similar technique may be used to fuse the layers of the material roll 12 together.

In some embodiments, one or more additional devices such as additional device 28 are included within the system 10. The additional device 28 may be disposed between the first roller 14 and the second roller 18 and/or proximate to the second roller 18. In some embodiments, the additional device 28 includes any combination of sensors, applicators, or other devices. For example, embodiments are contemplated in which an optical sensor is included to detect a tension of the material roll 12 or to analyze the surface of the material roll 12 during operation. However, it should be understood that other forms of detecting tension within the material roll 12 are also contemplated. For example, a load cell, strain gauge, or other form of tension detection may be disposed in either or both of the first roller 14 and the second roller 18.

Embodiments are contemplated in which the additional device 28 includes an applicator configured to apply a coating or another substance onto a surface of the material roll 12. For example, in some embodiments, the additional device 28 comprises an automatic dispenser operable to add an adhesive compound to at least one surface of the material roll 12 to increase adhesion between layers. Further, in some embodiments, the additional device 28 includes a heater or other mechanism for preheating the material roll prior to welding. Further still, in some embodiments, the additional device 28 includes a laser or cutting device configured to provide a groove, hole, or other surface alteration for receiving the weld 26. For example, embodiments are contemplated in which the cutting device provides a groove across a top surface of the material perpendicular to the direction of winding, the groove positioned to receive a continuous weld therein.

In some embodiments, the additional device 28 includes a surface treatment device such as a surface etcher or cutting device configured to cut grooves into an outer surface of layers of the material roll 12. The grooves may be configured to receive an adhesive, grease, or other filler material therein. For example, in some embodiments, the additional device 28 further includes an adhesive applicator configured to dispense adhesive onto the surface of the layers and within the grooves. Accordingly, the adhesive may be configured to join each layer onto the previously applied layer of the material roll 12.

Figure 1B:
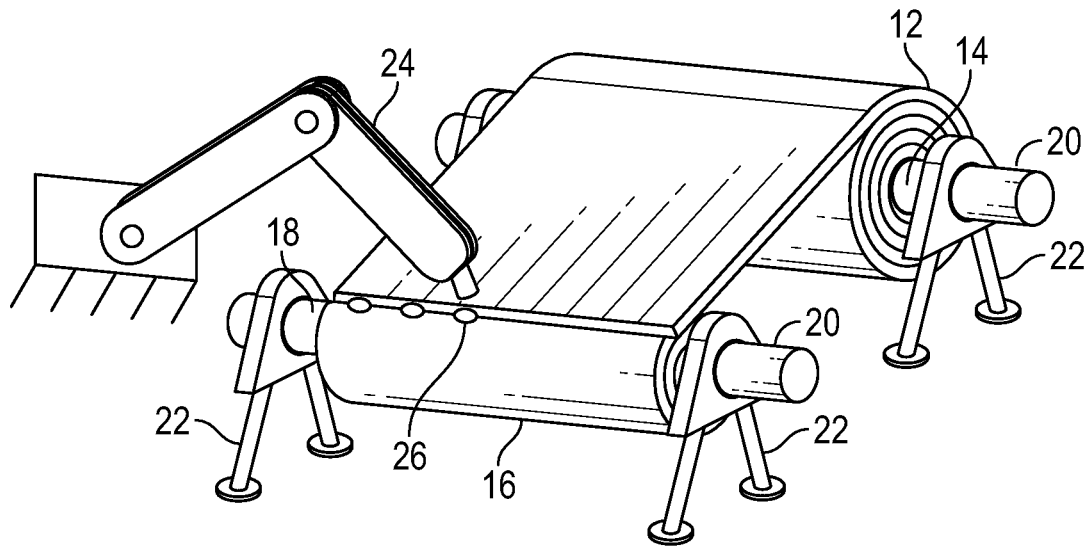

FIG. 1B illustrates another view of the exemplary additive manufacturing system 10 relating to some embodiments. As shown, the system 10 includes the material roll 12, the first roller 14, the liner 16, the second roller 18, the motor 20, the support structures 22, and the welder 24. The system 10 is shown at an initial stage of attaching an end of the material roll 12 to the liner 16. Accordingly, the welder 24 may be configured to apply one or more welds 26 at the point of connection between the liner 16 and the end of the material roll 12. In some embodiments, the welder 24 provides a plurality of spot welds 26, as shown, along a longitudinal axis of the liner 16. For example, spot welds 26 may be applied every inch, 2 inches, 4 inches, or another suitable distance along the longitudinal axis. Alternatively, embodiments are contemplated in which the welder 24 provides a continuous weld along the longitudinal axis of the liner 16. For example, a continuous weld bead may extend along a width of the material roll 12. In some embodiments, the continuous weld bead may extend along an axis parallel to the axis of rotation of the second roller 18.

In some embodiments, the welder 24 continues operation as the material roll 12 is wound onto the liner 16 such that welds 26 are applied to one or more subsequent layers of the material roll 12 to bind a plurality of layers from the material roll 12 onto the liner 16. Alternatively, embodiments are contemplated in which the liner 16 is not included. For example, an end of the material roll 12 may be removably attached directly to the second roller 18 and welded to a second layer.

It should be understood that a variety of different welding angles are contemplated. For example, the welder 24 may include a plurality of articulating robotic arms such that a laser head of the welder 24 is moved into position to apply the weld. The welder 24 may be configured to apply welds 26 from above the second roller 18 onto a top surface of the material roll 12 or from beneath the second roller 18 onto a bottom surface of the material roll 12. In some embodiments, the welding angle may change depending on the particular step of operation in the system. For example, the welder 24 may apply welds 26 from above the second roller 18 during the initial stage of joining the end of the material roll 12 to the outer surface of the liner 16 but apply welds from beneath the second roller 18 onto a bottom surface of subsequent layers of the material roll 12. Alternatively, or additionally, in some embodiments, the welds 26 may penetrate at least partially through the layers such that a weld may be applied to an outer surface of an outer layer and penetrate into the inner layer.

As described above, in some embodiments, one or more sensors may be included within the system 10. For example, sensors may be included for monitoring a tension of the material roll 12, analyzing the surface of the material roll 12, and/or analyzing a weight of the material roll 12 remaining on the first roller 14. In some embodiments, a feedback loop may be provided between the motor 20 and one or more sensors such that the motor 20 may be controlled based at least in part on at least one signal from the one or more sensors. For example, a controller may be included that is configured to control the operation of the motor 20, the welder 24, and other actively driven components based on the sensor signals or from operator instructions or stored automated instructions.

Figure 2:
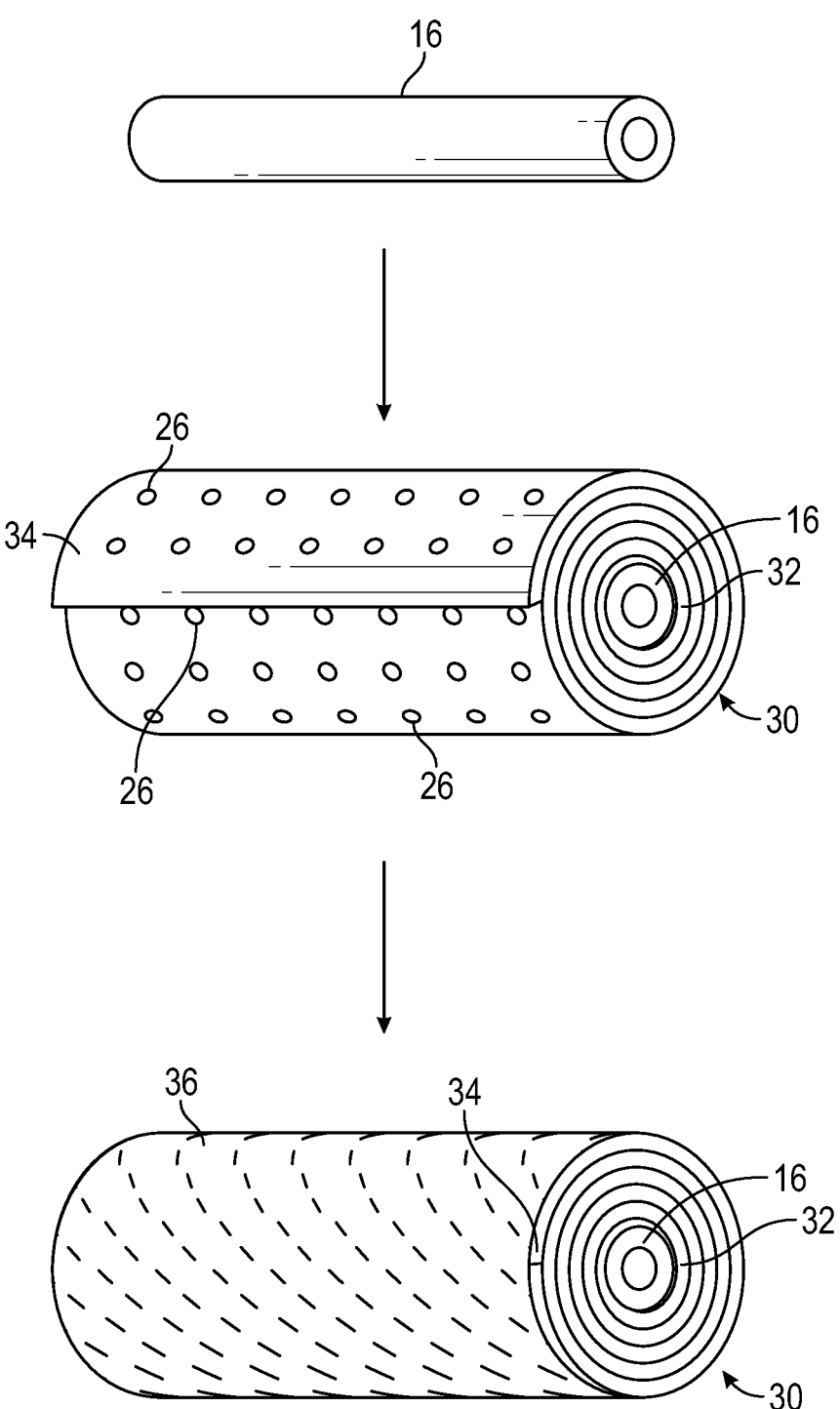
FIG. 2 illustrates exemplary stages of an additive manufacturing process for providing an additively manufactured part.

FIG. 2 illustrates exemplary stages of an additive manufacturing process for providing an additively manufactured part 30 relating to some embodiments. The additive manufacturing process may be performed using the system 10, as described above, or a similar manufacturing system. It should be understood that the part 30 shown is just one example of a particular additively manufactured structure and that a variety of other forms of structures are also contemplated.

In a first stage, the liner 16 is provided. The liner 16 may be an elongated, hollow cylindrical structure, as shown. However, it should be understood that a variety of different forms of liner 16 are also contemplated. For example, in some embodiments, the liner 16 may be a longitudinal cuboid shape or a longitudinal prism shape. Further still, embodiments are contemplated in which the liner 16 is not longitudinal and/or is not hollow.

In a second stage, the additively manufactured part 30 is formed by winding a plurality of layers of material onto the external surface of the liner 16. The plurality of layers includes an innermost layer 32 and an outermost layer 34, as shown. In some embodiments, any number of interstitial layers may be included between the innermost layer 32 and the outermost layer 34. The innermost layer 32 is attached to the liner 16 via a suitable attachment means such as welding, adhesive, or another suitable joining technique. In some embodiments, a plurality of welds 26 are included between the plurality of layers of material.

In a third stage, post-processing is applied to the additively manufactured part 30. For example, a surface feature 36 may be applied to an outer surface of the outermost layer 34, as shown. In some embodiments, the surface feature 36 may include a corrosion-resistant coating. Further, embodiments are contemplated in which the surface feature 36 includes a plurality of coating layers disposed over the outer surface of the part 30. For example, any combination of an epoxy coating, a ceramic coating, an electroplated coating, a galvanized coating, or another form of protective or functional coating may be included in the surface feature. Further still, in some embodiments, a surface finish may be applied to the outermost layer 34 in addition to or alternatively to the surface coating. For example, the outermost layer 34 may be cleaned, polished, or brushed. Additionally, in some embodiments, fusion welding may be used to further join layers of the additively manufactured part 30. In some embodiments, the liner may be removed in of after the third stage, leaving only the additively manufactured layers.

Figure 3:
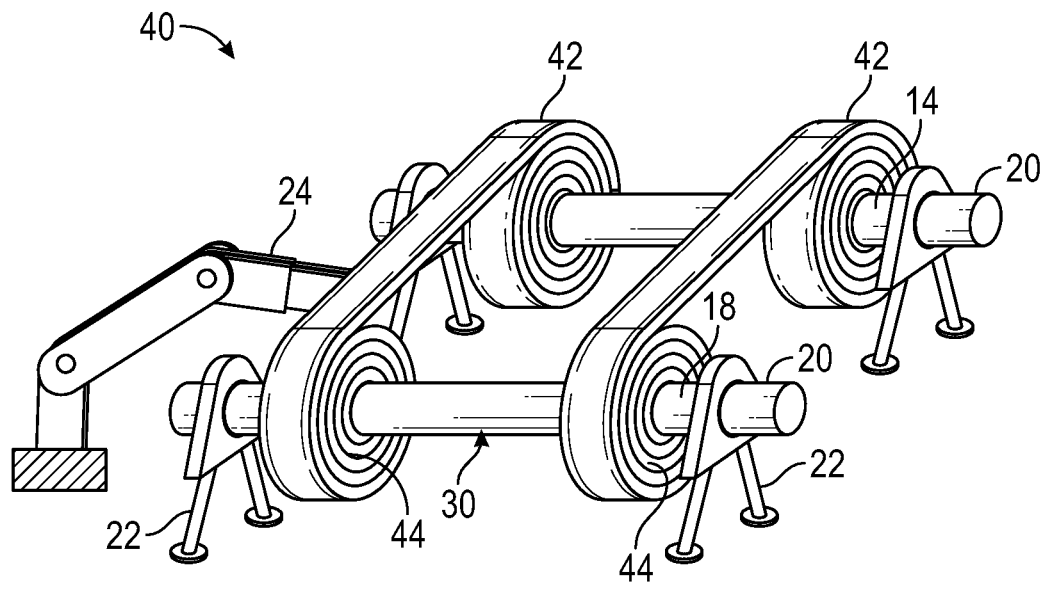
FIG. 3 illustrates an exemplary system for applying one or more additively manufactured flanges to the additively manufactured part.

FIG. 3 illustrates an exemplary system 40 for applying one or more additively manufactured flanges to the additively manufactured part 30 relating to some embodiments. In some embodiments, the flanges may be added after production of the additively manufactured part 30 shown in FIGS. 1A and 1B. Alternatively, in some embodiments, the flanges may be added during at least a portion of the initial production.

The system 40 includes one or more flange material rolls 42. The flange material rolls 42 may have a reduced width (i.e., be narrower) compared to the material roll 12. Accordingly, the flange material rolls 42 may be configured to be placed over a portion of the additively manufactured part 30, such as, for example, on the ends of the additively manufactured part 30, as shown. In some embodiments, the flange material rolls 42 may be made of a similar material to the material roll 12, as described above, such as laminate steel or other laminate material. Alternatively, in some embodiments, the flange material rolls 42 may be made of a different material. For example, the material roll 12 may be made from steel, while the flange material rolls 42 may be made from a thin laminate composite or ceramic material or a different alloy of steel.

The ends of the flange material rolls 42 may be extended to the additively manufactured part 30 and secured to an outer surface of the additively manufactured part 30. Any suitable joining technique described herein may be used to join the flange material rolls 42 to the additively manufactured part 30, such as welding or the application of a suitable adhesive. For example, the ends of the flange material rolls 42 may be spot welded or welded continuously onto the surface of the additively manufactured part 30 by welder 24 using laser beam welding or another suitable welding technique.

The flange material rolls 42 may be rolled onto the additively manufactured part 30, for example, driven by one or more motors disposed on or in the first roller 14 and second roller 18. In some embodiments, a plurality of layers of the flange material rolls 42 is disposed over a portion of the additively manufactured part 30 to produce one or more additively manufactured flanges 44.

In some embodiments, the welder 24 may be configured to apply a weld 26 onto a bottom surface of the flange material roll 42. Alternatively, in some embodiments, the welder 24 may apply a weld 26 to the top surface of the flange material roll 42 that penetrates into the previous layer. As described above, in some embodiments, the welder 24 operates without a filler metal. For example, a laser beam welding technique may be used that melts one or more layers of the 42 to fuse said rolls together.

Figure 4:
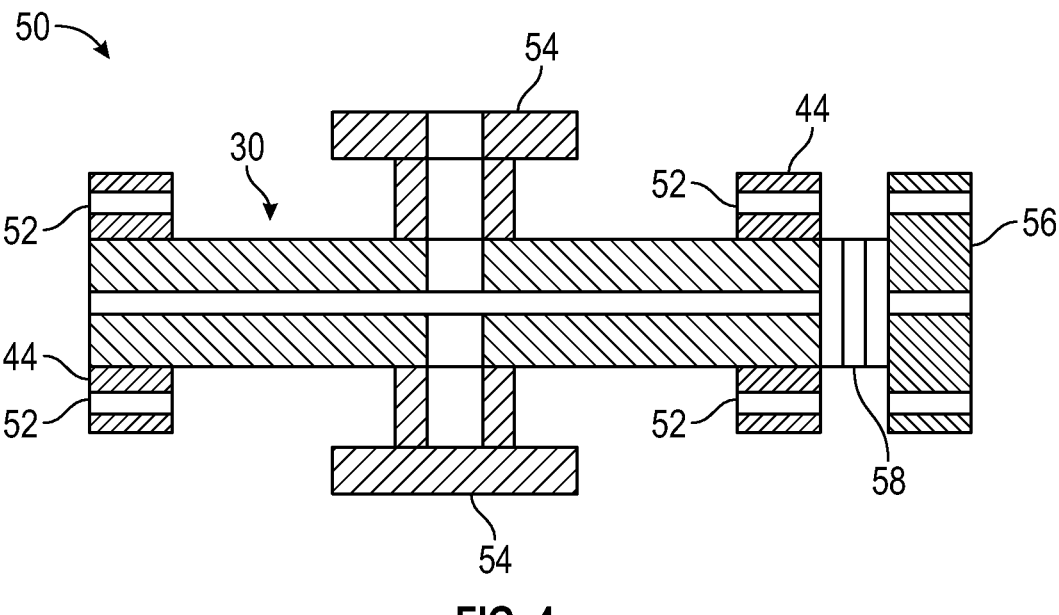
FIG. 4 illustrates a cutaway view of an exemplary assembly.

FIG. 4 illustrates a cutaway view of an exemplary assembly 50 relating to some embodiments. In some embodiments, assembly 50 includes the additively manufactured part 30 with one or more one or more additively manufactured flanges 44 disposed thereon, as well as one or more other components and additional features, as will be described in further detail below.

In some embodiments, one or more holes 52 may be drilled into the one or more additively manufactured flanges 44. For example, one or more holes 52 may be created in additively manufactured flange 4 and configured to receive fasteners such as bolts, screws, nails, rivets, or other suitable fasteners. In some such embodiments, said fasteners may be used to join the flanges 44 to one or more other components. In some embodiments, the one or more holes 52 may be drilled using a standard twist drill. Further, embodiments are contemplated in which the one or more holes 52 are produced using laser cutting techniques with a laser cutting device such as the welder 24. Accordingly, in some embodiments, the same laser welding device may be used to weld the layers of the additively manufactured part 30 and provide post-processing features, such as cutting holes 52. Further still, in some embodiments, the additively manufactured part 30 and/or flanges 44 may be processed to add reinforcement features prior to drilling holes 52. For example, in some embodiments, structural components such as a fastener receiving element may be disposed on or in the additively manufactured part 30 or the flange 44 and configured to receive a fastener. Said fastener receiving element may be welded onto the additively manufactured part 30 and provide structural reinforcement for torquing fasteners disposed therein.

In some embodiments, one or more perpendicular structures 54 may be attached to the additively manufactured part 30. For example, embodiments are contemplated in which perpendicular structures 54 are secured to a top surface of the additively manufactured part 30 and a bottom surface of the additively manufactured part 30, as shown, via welding, adhesives, fasteners, or another suitable joining technique.

In some embodiments, one or more coaxial structures 56 may be attached to the additively manufactured part 30. For example, a coaxial structure 56 may be disposed at an end of the additively manufactured part 30 and secured to one of the additively manufactured flanges 44. In some embodiments, the one or more coaxial structures 56 may be joined to the flange 44 using fasteners through the one or more holes 52 in the flange 44 and aligning the one or more holes 52 with respective holes on the one or more coaxial structures 56, as shown. Further, in some embodiments, a sealing element 58 may be disposed between the additively manufactured flange 44 and the coaxial structure 56. The sealing element 58 may include a deformable seal configured to deform in response to the tightening of the connection between the flange 44 and the coaxial structure 56.

Additionally, embodiments are contemplated in which a similar process may be used to add layers of different materials. For example, additional material rolls may be provided with distinct materials from the material roll 12 to add layers external to the plurality of layers from the material roll 12 or to add layers of a different material between layers of the material roll 12. For example, one or more layers of liner material may be applied first, forming an inner liner to additively manufactured part 30, followed by one or more internal structural layers, and finally, one or more layers of protective outer material.

Figure 5:
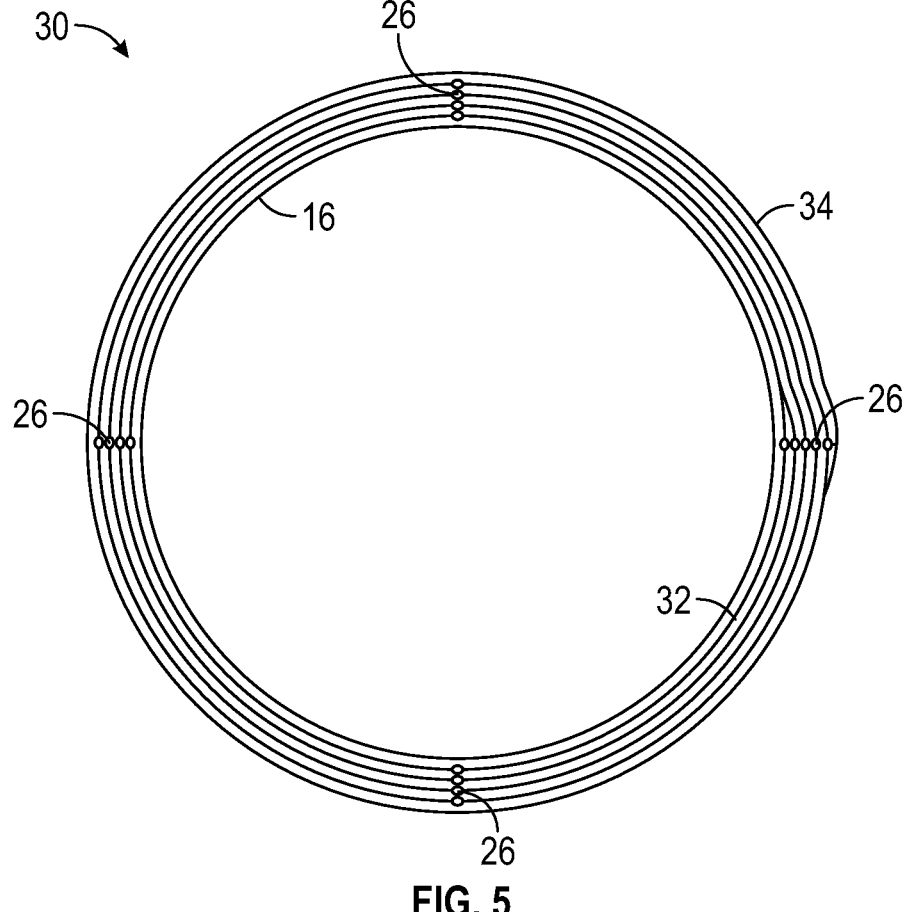
FIG. 5 illustrates an exemplary cross-sectional view of the additively manufactured part.

FIG. 5 illustrates an exemplary cross-sectional view of the additively manufactured part 30 relating to some embodiments. The additively manufactured part 30 includes a plurality of layers, including the innermost layer 32 and the outermost layer 34, along with any interstitial layers disposed therebetween. In some embodiments, the plurality of layers is disposed concentrically around the liner 16. The additively manufactured part 30 is depicted as an exemplary pipe with a circular cross-section; however, it should be understood that a variety of other cross-sectional shapes are contemplated for the additively manufactured part 30. For example, in some embodiments, the additively manufactured part 30 may include a rectangular, triangular, or other polygonal or curved cross-section. In some such embodiments, the cross-sectional shape of the part 30 may be determined by the shape of the liner 16. For example, a liner 16 with a rectangular cross-section produces a part with a rectangular cross-section when layers are wound onto the liner 16.

The layers of the additively manufactured part 30 may be secured using a plurality of welds 26. The welds 26 may be spot welds along a number of locations around the circumference of the cross-section. Alternatively, in some embodiments, the welds may include one or more continuous welds that run a substantial portion of the length of the part normal to the cross-section. Further, in some embodiments, a combination of spot welds and continuous welds is contemplated. The welds 26 may be placed at predetermined locations along the circumference of the cross-section. For example, a plurality of welds may be placed along quadrants of the circumference (as shown) and aligned with welds of previous layers. Alternatively, in some embodiments, the welds 26 may be staggered from the previous layer to distribute loading of the additively manufactured part 30 more evenly during use. In some embodiments, the plurality of welds 26 prevents the unspooling of the layers during fabrication and during use.

In some embodiments, the welds 26 improve the distribution of a pressure load during use. As an example, a layered part without welding and little to no friction between layers may exhibit unspooling behavior as the spool expands radially due to internal pressure. Further, a lack of friction and connectivity between the layers prevents load sharing between intermediate layers such that the pressure load is predominately supported by the innermost layer and the outermost layer. Conversely, embodiments contemplated with welds 26 between layers counter unspooling behavior and distribute stress to the intermediate layers. In some such embodiments, a combination of friction between layers and welds produces lower mean stress in individual layers compared to similar parts without welds and with lower or no friction between layers. In some embodiments, friction between layers may be produced naturally, such as via natural cold-welding behavior as the layers are wound. Alternatively, embodiments are contemplated in which friction between layers may be improved actively. For example, grooves or surface features may be added to the layers to increase inter-layer friction. Further, in some embodiments, adhesives may be used to increase friction and connectivity between layers. Friction and adhesion between the plurality of layers of the additively manufactured part 30 may occur or be created in a number of ways, as described in further detail below.

In some embodiments, the multilayered part 30 is configured to support extreme pressure loads, such as pressures between 10-15 kilopound per square inch (ksi). Alternatively, in some embodiments, other pressure ranges are contemplated. For example, multilayered parts 30 may be designed for lower pressures depending on the specific context of the operating environment. Further, in some embodiments, the thickness of the layers and the number of layers in the plurality of layers of the multilayered part 30 may be selected to achieve a particular pressure rating. Further still, in some embodiments, the joining technique(s) used may be selected to adjust the pressure rating further. For example, fusion welding between layers may produce a part capable of withstanding a higher pressure compared to a similar part joined with only adhesive or cold welding.

In some embodiments, the layers may include smooth, flat surfaces that create a suction effect when pressed together during winding. Similar, for example, to a suction cup, air is prevented from entering between the layers such that external air pressure holds the layers together. Additionally, in some embodiments, the layers have microscopic pores and crevices on the surface that expand when heated and contract when cooled. Heating and subsequent cooling squeeze trapped air and moisture from the pores and crevices, thereby producing a vacuum interaction that causes the layers to stick together. For example, the vacuum interaction may generate friction between a first layer and a second layer of the plurality of layers. Additionally, residual oil and/or grease may be present on the surfaces of the layers and act as an adhesive by forming a thin film between the layers and filling in the aforementioned pores and crevices.

In some embodiments, effects such as cold welding improve friction and adhesion between layers. For example, layers of similar metal material may fuse together without melting and fuse together due to molecular attraction and high pressure applied by the tension of the spooling process. Cold welding may be improved by providing a clean, smooth surface of the layers and by pre-treating to remove oxides and contaminates from the surface. Accordingly, in some embodiments, additional cleaning and surface finishing techniques may be performed to improve the cold weldability of the layers.

Certain levels of corrosion may also increase friction and adhesion between layers. For example, corrosion between layers associated with chemical reactions, such as surface oxidation of layers, produces friction that adheres the layers together without negatively impacting the properties of the additively manufactured part 30. Embodiments are contemplated in which certain parameters, such as temperature and humidity, may be selected to produce a particular level of corrosion between layers. In some embodiments, the corrosion may be controlled within a predetermined threshold level to prevent degradation associated with extreme levels of corrosion. Further, in some embodiments, fluid coatings or other additives may be used to increase corrosion up to a certain level. Alternatively, in some embodiments, corrosion may be reduced or prevented, for example, by using any combination of surface finishing techniques, controlling temperature and humidity, and preventing oxidation.

In some embodiments, the additively manufactured part 30 includes layers with a thickness of about one-eighth of an inch. Alternatively, in some embodiments, other thicknesses are contemplated. For example, one or more layers may have a thickness of about one-sixteenth of an inch, about one-fourth of an inch, less than one-fourth of an inch, less than one-eighth of an inch, or less than one-sixteenth of an inch. In some embodiments, the additively manufactured part 30 may include a hollow cylindrical shape with an internal diameter of about seven and one-half of an inch to about seven and three-fourths of an inch. Alternatively, in some embodiments, other internal diameters are contemplated. For example, larger diameters or smaller diameters are contemplated depending on the specific application for the additively manufactured part 30. As an example, the internal diameter of liner 16 or the overall diameter of additively manufactured part 30 may be selected to match the diameter of an existing pipe that is being replaced or to which additively manufactured part 30 is to be connected.

Figure 6:
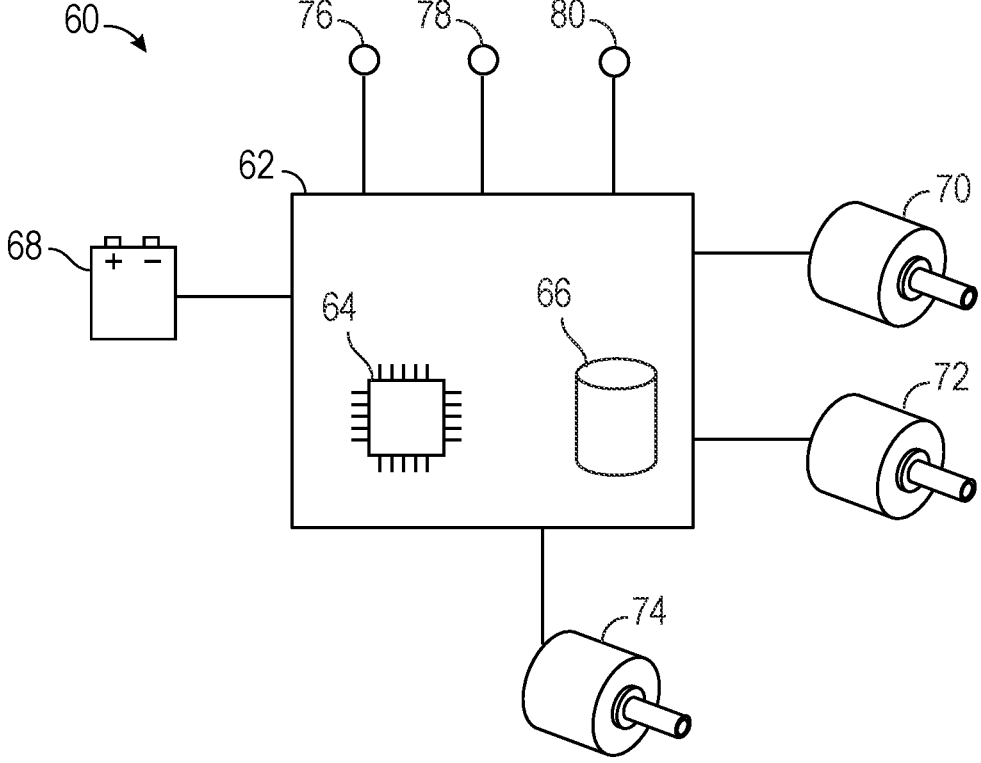
FIG. 6 illustrates an exemplary control system for the additive manufacturing system.

FIG. 6 illustrates an exemplary control system 60 for the additive manufacturing system 10 relating to some embodiments. In some embodiments, the control system 60 may be integrated into the exemplary additive manufacturing system 10, as shown in FIGS. 1A and 1B. Alternatively, in some embodiments, the control system 60 may be separate but communicatively coupled to the system 10. Further, in some embodiments, the control system 60 may be at least partially remote from the system 10. For example, a remote cloud-based control system may be operable to control the operation of the system 10 from a remote location.

The control system 60 includes a controller 62 operable to control components of the system 10. For example, in some embodiments, the controller 62 includes a processor 64 and a storage 66 such that a control operation may be carried out by executing computer-readable instructions stored within the storage 66 on the processor 64. The controller 62 may be coupled to a power source 68, such as a battery, a grid power connection, or another suitable electrical power source. Alternatively, in some embodiments, other forms of power sources are also contemplated. For example, a hydraulic or pneumatic power source may be used to power one or more motors, such as servomotors of the rollers 14 and 18. In some embodiments, a combination of multiple types of power sources is contemplated. For example, an electrical power source may be included to power the controller, while a hydraulic or other form of power source is used to drive one or more motors.

In some embodiments, a plurality of motors is coupled to the controller 62, and the controller 62 is programmed to control the operation of the plurality of motors. For example, control system 60 may include a first motor 70 to drive the rotation and control torque of the first roller 14, a second motor 72 to drive the rotation and control torque of the second roller 18, and a third motor 74 to drive the rotation of a pivot point of a robotic system associated with the welder 24. In some embodiments, other forms of positioning the welder 24 are contemplated. For example, in some embodiments, the welder 24 includes a robotic laser welding device including a plurality of pivotable members that are rotatable via respective motors disposed at each pivot point. Alternatively, embodiments are contemplated in which the welder 24 includes a positioning rail system. For example, a laser welder emitter may be disposed on a translatable structure configured to translate along a predetermined path within a rail structure. In such embodiments, the translation may be driven by rotational motion such as via the third motor and/or one or more other motors.

In some embodiments, one or more sensors may be communicatively coupled to the controller 62. For example, any combination of a first sensor 76, a second sensor 78, and a third sensor 80 may be coupled to controller 62 to provide at least one signal to controller 62. Embodiments are contemplated in which at least one of sensor 76, sensor 78, and sensor 80 is used to provide a feedback control signal to the controller 62. For example, sensor 76 may be configured to provide an optical signal indicative of tension present in the material roll 12 to controller 62 such that control of the motors 70 and 72 may be adjusted based on the tension to maintain a suitable level of tension. As an example, if the optical sensor detects droop in the extended portion of the material roll 12, controller 62 may instruct the operation of the first motor 72 so as to increase tension on the material roll 12. Alternatively, in some embodiments, a tensile force may be measured directly, such as by using a force sensor disposed on one of the rollers 14 or 18 or directly onto the material roll 12. In such embodiments, a predetermined threshold range of tension may be maintained by driving the motors 70 and 72 in a particular direction responsive to the tension falling out of the threshold range.

In some embodiments, additional sensors may be included, for example, to monitor the surface of layers of the material roll 12, detect a remaining amount of thin laminate material on the material roll 12, and monitor the current position of the welder 24. Such additional sensors may include any combination of optical sensors, accelerometers, gyroscopes, strain gauges, temperature sensors, and load cells. In some embodiments, monitoring the surface of each layer of the material roll 12 as the layers are rolled onto the liner 16 allows for a more thorough inspection process compared to traditional fabrication techniques. For example, processes such as casting do not allow inspection between layers within a thick cast part such that only the outer surface is able to be inspected.

Embodiments are contemplated in which at least one of sensor 76, sensor 78, and sensor 80 includes a camera such that images may be captured throughout the layering process to preserve a record of the layer for later inspection and analysis of the multilayered structure. Captured images may be stored within storage 66 of controller 62 or exported elsewhere to one or more external storage devices.

In some embodiments, a feedback control loop may be carried out using controller 62. For example, the second roller 18 may be actively driven using the second motor 72, and a feedback control loop may be iterated to control the operation of the first motor 70 to maintain the tension of the material roll 12 based at least in part on the control of the second motor 72.

In some embodiments, the control system 60 may be at least partially automated. For example, an automated operation procedure may be performed by the control system 60 with little to no operator interaction. In some embodiments, the control system 60 autonomously controls the operation of the additive manufacturing system 10 such that a human operator is not required to be onsite or in the vicinity of operation to improve safety and produce an efficient process. As such, embodiments are contemplated in which the additive manufacturing process described herein may be fully automated to enhance efficiency and safety over traditional manual processes. For example, the process may be performed on-demand and onsite in proximity to a subsea environment using fully automated operation such that human operators may not be present. Alternatively, in some embodiments, the control system 60 may be configured to perform operations responsive to manual inputs from an operator. Further still, embodiments are contemplated in which the operation of the additive manufacturing system 10 may be controlled entirely using manual operation.

FIG. 7 illustrates an exemplary method, referred to herein as method 700, of additively manufacturing a multi-layered structure, such as the additively manufactured part 30 relating to some embodiments. In some embodiments, method 700 may be performed using components described with respect to the system 10. Further, in some embodiments, one or more steps of the method 700 are performed by or instructed by the control system 60, as described above.

At step 702, the material roll 12 is placed on or otherwise attached to the first roller 14. In some embodiments, a portion of the first roller 14 may be configured to receive the material roll 12 thereon. For example, in some embodiments, a portion at an end of the first roller 14 may be removable such that the material roll 12 may be placed over an internal shaft of the roller 14. Further, in some embodiments, one or more latches, locks, or other fastening means may be used to secure an inner portion of the material roll 12 onto the first roller 14.

At step 704, the liner 16 is placed on or otherwise attached to the second roller 18. In some embodiments, the liner 16 may be disposed on the second roller 18 as described above with respect to the material roll 12 onto the first roller 14. For example, liner 16 may be placed over an internal shaft of second roller 18. Additionally, liner 16 may be removably attached to second roller 18, for example, using one or more locks, latches, or other locking mechanisms. Alternatively, in some embodiments, the liner 16 may be removably secured to the second roller 18 via one or more temporary spot welds or another temporary attachment means.

At step 706, the end of the material roll 12 is extended to the second roller 18. In some embodiments, the end of the material roll 12 is extended to the second roller 18 via automated means. For example, in some embodiments, one of the roller 14 or roller 18 may be moved within a motorized track. Alternatively, or additionally, one or more robotic arms or other robotic devices may be used to move the end of the material roll 12 toward the second roller 18.

At step 708, the end of the material roll 12 is joined or otherwise attached to liner 16. In some embodiments, the end of the material roll 12 is joined to the liner 16 via welding, as shown in FIG. 1B. Alternatively, in some embodiments, another form of joining may be used, such as applying adhesive or use of one or more fasteners, such as bolts, to fasten the end of the material roll to the material roll 12. However, it should be understood that, in some embodiments, the use of fasteners penetrating into the liner 16 may be avoided to maintain a pressure seal of the liner 16. Alternatively, in some embodiments, the liner 16 may not be included. Accordingly, the end of the material roll 12 may be temporarily joined to the second roller 18 via a temporary weld or other attachment means described herein.

At step 710, tension is maintained in the material roll 12 simultaneously while unrolling and joining the material roll 12. In some embodiments, tension is maintained using a tensioning device, such as the braking mechanism 21 or motor 20. For example, embodiments are contemplated in which a motor 20 of the first roller 14 counteracts a motor 20 of the second roller 18. In some embodiments, the one or more instances of motor 20 may include servomotors configured to maintain tension in the material roll 12 while the roll is unspooled and wound onto the second roller 18. Further, in some embodiments, sensors such as optical sensors and/or force sensors may be used to monitor tension in the material roll 12, and the one or more instances of motor 20 may be driven to increase tension as needed based on signals from the sensors.

At step 712, additional layers of the material roll 12 are wound onto the second roller 18. In some embodiments, any number of additional layers may be wound onto the second roller 18 in addition to the initial layer 32. For example, in some embodiments, two layers, four layers, or eight layers in total may be wound onto the second roller 18. However, it should be understood that any number of layers may be added, and, in some embodiments, the number of layers may be determined based on the operational environment of the multilayered structure. For example, the number of layers may be determined to provide a particular operating pressure rating during use. Here, the number of layers may be increased to increase the operating pressure rating.

At step 714, at least one subsequent layer of the material roll 12 is joined to the previous layer. The subsequent layers may be joined to previous layers via welding, adhesive, or another suitable joining technique described herein. For example, embodiments are contemplated in which cold welding between layers is the primary means of attachment. Alternatively, or in addition, fusion welding may be used to weld at least one subsequent layer to the previous layer via spot welds, a continuous weld, or a combination thereof. Further still, in some embodiments, an adhesive may be used to join one or more layers.

Embodiments are contemplated in which each subsequent layer of the plurality of layers is welded to the respective previous layer. Alternatively, in some embodiments, only a portion of the plurality of layers are welded together or actively attached. For example, in some embodiments, every other layer may be welded or every third layer. Further, in some embodiments, only an initial layer and a final layer are welded. Accordingly, welding at least one subsequent layer to a previous layer, as referred to herein, may describe welding each layer, welding every other layer, welding every third layer, or welding another suitable portion of the plurality of layers based on the specific application of the multilayered part 30. For example, the specific portion of layers that are welded may be determined based on the pressure requirements of the multilayered part 30 such that a part for relatively higher pressure operation has a larger portion of layers welded together.

At step 716, one or more features are added to the layered part 30 using additional material rolls. For example, one or more additively manufactured flanges 44 may be applied using a similar technique as described above with respect to FIG. 3. However, it should be understood that, in some embodiments, flanges and additional features may not be added. For example, method 700 may be performed to produce a layered pipe without flanges or additional features.

At step 718, the layered part 30 is removed from the second roller 18. In some embodiments, the layered part 30 may be removably attached to the second roller 18 such that the layered part 30 can be removed from the internal shaft of the second roller 18. Further, in some embodiments, removing the layered part 30 includes cutting a remaining portion of the material roll 12. For example, if a maximum number of layers is added, the rolling process may be stopped, and a cutting device may be used to detach the rolled layers from the remaining portion of the material roll 12. In some embodiments, the welding device, such as the welder 24, is used to provide the cut that severs the layered part 30 from the remaining portion of the material roll 12. Accordingly, the remaining portion of the material roll 12 may be used to fabricate another multilayered part or recycled for another purpose. In some embodiments, liner 16 may be removed (for example, for reuse).

At step 720, one or more post-processing techniques may be applied to the layered part 30. In some embodiments, the post-processing techniques may include applying an external coating, such as a corrosion-resistant coating, applying an internal coating, such as a corrosion-resistant coating, applying a surface finish, tapping holes into a portion of the layered part 30, welding the layered part 30 to one or more other components, or other forms of post-processing, as well as combinations thereof. Further, in some embodiments, at least a portion of the post-processing techniques may be performed before the layered part 30 is removed from the second roller 18 at step 718.

In some embodiments, post-processing may include adding a seal to at least a portion of the multilayered part 30. For example, a polymer seal may be placed over one or both ends of the multilayered part 30 to seal the edges of the layers. In some embodiments, the polymer seal may include a material additive that is added to fill ridges between the layers and provide a seal. Additionally, or alternatively, in some embodiments, a sealing material coating may be applied over at least a portion of the external surface of the multilayered part 30.

In some embodiments, additional steps may be included to provide additional material layers of another material. For example, the material roll 12 may include a thin laminate steel and layers of another material may be intertwined between the layers of steel. Alternatively, multiple material rolls 12 may be employed, one for each type of layer. In one such example, a multilayered part 30 may be provided with a plurality of layers of steel with composite layers disposed between each steel layer. Other material rolls are contemplated in addition to or in place of the thin laminate steel material roll. For example, any combination of other metals, composites, ceramics, polymers, and glass may be used to produce layers in the multilayered part 30. It should be understood that in such embodiments with layers of material other than metal, different joining techniques may be used. For example, if thin ceramic layers are included in the multilayered part 30, joining techniques such as adhesives, soldering, or brazing may be used.

In some embodiments, at least a portion of the steps of method 700 may be performed on-demand and onsite in proximity to a subsea environment. For example, system 10 may be disposed on a sea barge or other watercraft such that system 10 can be positioned over a subsea environment. Accordingly, embodiments are contemplated in which multilayered part 30 may be fabricated as needed based on real-time demand in the subsea environment. For example, if a pipe bursts or an adapter is needed to attach to an existing pipeline, the multilayered part 30 can be fabricated to replace the burst pipe or act as an adapter with the corresponding dimensions.

The following embodiments represent exemplary embodiments of concepts contemplated herein. Any one of the following embodiments may be combined in a multiple-dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting.

Clause 1. A system for additively manufacturing a multilayered structure, the system comprising: a material roll of laminate material; a roller configured to unroll the laminate material from the material roll and wind a plurality of layers of the laminate material onto a liner; a tensioner device configured to maintain tension in the material roll during winding of the plurality of layers onto the liner; and an automated welder configured to weld a first layer of the plurality of layers to the liner and to weld at least one subsequent layer of the plurality of layers to a previous layer.

Clause 2. The system of clause 1, wherein the material roll comprises laminate steel.

Clause 3. The system of any of clauses 1 or 2, wherein a vacuum interaction generates friction between the first layer and a second layer of the plurality of layers.

Clause 4. The system of any of clauses 1 through 3, wherein the liner comprises an elongate, hollow cylindrical structure.

Clause 5. The system of any of clauses 1 through 4, further comprising: one or more narrower material rolls of laminate material, wherein the roller is further configured to unroll laminate material from the one or more narrower material rolls and wind the laminate material from the one or more narrower material rolls over the plurality of layers to form one or more flanges.

Clause 6. The system of any of clauses 1 through 5, further comprising: a first motor coupled to the material roll, the first motor configured to drive rotation of the material roll; and a second motor coupled to the roller, the second motor configured to drive rotation of the roller.

Clause 7. The system of any of clauses 1 through 6, further comprising: a control system including at least one processor, the control system programmed to control operation of the first motor and the second motor.

Clause 8. A process for additively manufacturing a multilayered structure, the process comprising: providing a material roll of laminate material; unspooling the material roll of laminate material onto a roller to form a plurality of layers; simultaneously maintaining tension in the material roll while unspooling the material roll; and welding, using an automated welding device, at least one subsequent layer of the plurality of layers to a previous layer of the plurality of layers to form the multilayered structure.

Clause 9. The process of clause 8, further comprising: welding each subsequent layer of the plurality of layers to the respective previous layer of the plurality of layers.

Clause 10. The process of any of clause 8 or 9, further comprising applying an external coating over an external surface of an outermost layer of the plurality of layers, wherein the external coating comprises a corrosion-resistant coating.

Clause 11. The process of any of clause 8 through 10, further comprising: after welding the plurality of layers, tapping one or more holes into the multilayered structure, the one or more holes configured to receive fasteners for joining the multilayered structure to one or more other components.

Clause 12. The process of any of clause 8 through 11, further comprising: applying an adhesive to at least a portion of the plurality of layers while unspooling the material roll.

Clause 13. The process of any of clause 8 through 12, further comprising: joining an end of the material roll to an internal liner disposed on the roller.

Clause 14. The process of any of clause 8 through 13, further comprising: winding one or more narrower material rolls onto the plurality of layers to form one or more flanges.

Clause 15. The process of any of clause 8 through 15, wherein the process is performed on-demand and onsite in proximity to a subsea environment.

Clause 16. A system for additively manufacturing subsea structures on-demand and onsite, the system comprising: a material roll of laminate steel material; a roller configured to unroll the laminate steel material under tension from the material roll and wind a plurality of layers of the laminate steel material onto the roller; and a welding device configured to weld at least one subsequent layer of the plurality of layers to a previous layer.

Clause 17. The system of clause 16, wherein the welding device is configured to weld each subsequent layer of the plurality of layers to the respective previous layer.

Clause 18. The system of any of clause 16 or 17, wherein the laminate steel material comprises a thickness of less than one eighth of an inch.

Clause 19. The system of any of clauses 16 through 18, further comprising: one or more sensors configured to monitor a tension within the material roll during winding of the plurality of layers onto the roller.

Clause 20. The system of any of clauses 16 through 19, further comprising: a tensioner device configured to maintain tension in the material roll during winding of the plurality of layers onto the roller based on at least one signal from the one or more sensors.

Although the present disclosure has been described with reference to the embodiments illustrated in the attached drawing figures, it is noted that equivalents may be employed, and substitutions made herein without departing from the scope of the present disclosure as recited in the claims.

Having thus described various embodiments of the present disclosure, what is claimed as new and desired to be protected by Letters Patent includes the following:

What is claimed is:

1. A system for additively manufacturing a multilayered structure, the system comprising:
a material roll of laminate material;
a roller configured to unspool the laminate material from the material roll and wind a plurality of layers of the laminate material onto a liner;
a tensioner device configured to maintain tension in the material roll during winding of the plurality of layers onto the liner;
an automated welder configured to weld a first layer of the plurality of layers to the liner and to weld at least one subsequent layer of the plurality of layers to a previous layer; and
one or more narrower material rolls of the laminate material,
wherein the roller is further configured to unspool the laminate material from the one or more narrower material rolls and wind the laminate material from the one or more narrower material rolls over the plurality of layers to form one or more flanges.

2. The system of claim 1, wherein the material roll comprises laminate steel.

3. The system of claim 1, wherein a vacuum interaction generates friction between the first layer and a second layer of the plurality of layers.

4. The system of claim 1, wherein the liner comprises an elongated, hollow cylindrical structure.

5. The system of claim 1, further comprising:
a first motor coupled to the material roll, the first motor configured to drive first rotation of the material roll; and
a second motor coupled to the roller, the second motor configured to drive second rotation of the roller.

6. The system of claim 5, further comprising:
a control system including at least one processor, the control system programmed to control operation of the first motor and the second motor.

7. The system of claim 1, wherein the liner comprises a rigid structure formed of a metal alloy.

8. A process for additively manufacturing a multilayered structure, the process comprising:
providing a material roll of laminate material;
unspooling the material roll of the laminate material onto a roller to form a plurality of layers;
simultaneously maintaining tension in the material roll while unspooling the material roll;
welding at least one subsequent layer of the plurality of layers to a previous layer of the plurality of layers to form the multilayered structure; and
winding one or more narrower material rolls onto the plurality of layers to form one or more flanges.

9. The process of claim 8, further comprising:
welding each subsequent layer of the plurality of layers to the respective previous layer of the plurality of layers.

10. The process of claim 8, further comprising:
applying an external coating over an external surface of an outermost layer of the plurality of layers,
wherein the external coating comprises a corrosion-resistant coating.

11. The process of claim 8, further comprising:
after welding the plurality of layers, tapping one or more holes into the multilayered structure, the one or more holes configured to receive fasteners for joining the multilayered structure to one or more other components.

12. The process of claim 8, further comprising:
applying an adhesive to at least a portion of the plurality of layers while unspooling the material roll.

13. The process of claim 8, further comprising:
joining an end of the material roll to an internal liner disposed on the roller.

14. The process of claim 8, wherein the process is performed on-demand and onsite in proximity to a subsea environment.

15. A system for additively manufacturing subsea structures on-demand and onsite, the system comprising:
a material roll of laminate steel material;
a roller configured to unspool the laminate steel material under a tension from the material roll and wind a plurality of layers of the laminate steel material onto the roller; and
a welding device configured to weld at least one subsequent layer of the plurality of layers to a previous layer; and
one or more narrower material rolls of laminate material,
wherein the roller is further configured to unspool the laminate material from the one or more narrower material rolls and wind the laminate material from the one or more narrower material rolls over the plurality of layers to form one or more flanges.

16. The system of claim 15, wherein the welding device is configured to weld each subsequent layer of the plurality of layers to the respective previous layer.

17. The system of claim 15, wherein the laminate steel material comprises a thickness of less than one-eighth of an inch.

18. The system of claim 15, further comprising:

one or more sensors configured to monitor the tension within the material roll during winding of the plurality of layers onto the roller.

19. The system of claim 18, further comprising:

a tensioner device configured to maintain the tension in the material roll during the winding of the plurality of layers onto the roller based on at least one signal from the one or more sensors.

20. The system of claim 15, further comprising:

a liner structure supported on the roller disposed concentrically internal to the plurality of layers.

\* \* \* \* \*